(12) United States Patent
He et al.

(10) Patent No.: US 8,626,770 B2
(45) Date of Patent: Jan. 7, 2014

(54) ICEBERG QUERY EVALUATION IMPLEMENTING A COMPRESSED BITMAP INDEX

(75) Inventors: Bin He, San Jose, CA (US); Hui-I Hsiao, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/772,307

(22) Filed: May 3, 2010

(65) Prior Publication Data

US 2011/0270871 A1 Nov. 3, 2011

(51) Int. Cl.
*G06F 17/30* (2006.01)

(52) U.S. Cl.
USPC .......................................... 707/741; 707/769

(58) Field of Classification Search
USPC ................................. 707/741, 769
See application file for complete search history.

(56) References Cited

U.S. PATENT DOCUMENTS

| 5,819,256 | A | | 10/1998 | Ozbutun et al. |
| 6,141,656 | A | * | 10/2000 | Ozbutun et al. ........ 707/999.003 |
| 6,216,125 | B1 | | 4/2001 | Johnson |
| 6,507,835 | B1 | | 1/2003 | Amundsen et al. |
| 6,519,604 | B1 | | 2/2003 | Acharya et al. |
| 6,697,800 | B1 | * | 2/2004 | Jannink et al. .......................... 1/1 |
| 6,895,411 | B2 | * | 5/2005 | Keller ................. 1/1 |
| 2002/0188601 | A1 | | 12/2002 | Abdo |
| 2007/0112794 | A1 | * | 5/2007 | McRae ......................... 707/100 |
| 2008/0162478 | A1 | | 7/2008 | Pugh et al. |
| 2008/0263072 | A1 | * | 10/2008 | Koskas ........................ 707/101 |
| 2009/0055436 | A1 | | 2/2009 | Ayeni |
| 2010/0174670 | A1 | * | 7/2010 | Malik et al. ..................... 706/12 |
| 2010/0332501 | A1 | * | 12/2010 | Hanson et al. ................. 707/759 |

OTHER PUBLICATIONS

Bae et al. "Partitioning Algorithms for the Computation of Average Iceberg Queries", Y. Kambayashi et al. (Eds.): DaWaK 2000, LNCS 1874. pp. 276-286, 2000.
Computing Iceberg Queries Efficiently, [online]; [retrieved on Jan. 26, 2010]; retrieved from the Internet http://www.sigmod.org/vldb/conf/1998/p299.pdf.

* cited by examiner

*Primary Examiner* — Son T Hoang
(74) *Attorney, Agent, or Firm* — Cantor Colburn LLP

(57) ABSTRACT

Exemplary embodiments include an iceberg query method, including processing the iceberg query using a bitmap index having a plurality of bitmap vectors in a database, eliminating any of the plurality of bitmap vectors in the bitmap index that fails to meet a given condition thereby forming a subset of the plurality of bitmap vectors and aligning the vectors in the subset of the plurality of bitmap vectors in the bitmap index according to respective positions of the bitmap vectors in the subset of the plurality of bitmap vectors.

19 Claims, 8 Drawing Sheets

100

| A | B | C | ... |
|---|---|---|-----|
| a | x | | |
| b | y | | |
| c | y | | |
| a | x | ... | ... |
| c | z | | |
| b | y | | |
| a | x | | |
| b | x | | |

| a | 10010010 |
|---|----------|
| b | 01000101 |
| c | 00101000 |

Bitmap Index of A

100

| A | B | C | ... |
|---|---|---|-----|
| a | x |   |     |
| b | y |   |     |
| c | y |   |     |
| a | x | ... | ... |
| c | z |   |     |
| b | y |   |     |
| a | x |   |     |
| b | x |   |     |

| a | 10010010 |
|---|----------|
| b | 01000101 |
| c | 00101000 |

Bitmap Index of A

| 0x3, 1x28 | 1x31 | 1x27, 0x4 | 0x62 | 0x5, 1x4 |
|-----------|------|-----------|------|----------|
| 0FFFFFFF  | C0000001 | 7FFFFFF0 | 80000002 | 03C00000 |
| literal   | 1-fill | literal | 0-fill | literal |

ICEBERG QUERY EVALUATION IMPLEMENTING A COMPRESSED BITMAP INDEX

BACKGROUND

The present invention relates to database queries, and more specifically, to database iceberg queries implementing database indices.

Mining and decision making systems often compute aggregate functions over one or more attributes in very large databases and warehouses. An iceberg query is a class of an aggregate query, which selects aggregate values above a given threshold. An iceberg query is useful because high frequency events or high aggregate values often carry insightful information. Existing techniques for computing iceberg queries can be categorized as tuple-scan based approaches, which require at least one table scan to read data from disk and a significant amount of CPU time to compute the aggregation tuple-by-tuple. Such a tuple-scan based scheme often makes performance of iceberg queries unsatisfactory, especially when the table is large but the returned iceberg result set is very small. These problems are typical for tuple-scan based algorithms, since they cannot obtain the accurate aggregate result without reading and scanning through all the tuples.

SUMMARY

Exemplary embodiments include an iceberg query method, including processing the iceberg query using a bitmap index having a plurality of bitmap vectors in a database, eliminating any of the plurality of bitmap vectors in the bitmap index that fails to meet a given condition thereby forming a subset of the plurality of bitmap vectors and aligning the vectors in the subset of the plurality of bitmap vectors in the bitmap index according to respective positions of the bitmap vectors in the subset of the plurality of bitmap vectors.

Additional exemplary embodiments include a computer program product for performing an iceberg query, the computer program product including instructions for causing a computer to implement a method, the method including processing the iceberg query using a bitmap index having a plurality of bitmap vectors in a database, eliminating any of the plurality of bitmap vectors in the bitmap index that fails to meet a given condition thereby forming a subset of the plurality of bitmap vectors and aligning the vectors in the subset of the plurality of bitmap vectors in the bitmap index according to respective positions of the bitmap vectors in the subset of the plurality of bitmap vectors.

Additional exemplary embodiments include an iceberg query method in a database, the method including processing a plurality of bitmap vectors vertically organized in a bitmap index by eliminating, by dynamic pruning, any of the bitmap vectors that fail to meet a given condition, leaving a subset of the plurality of bitmap vectors, wherein the bitmap vectors are aligned according to a respective position of each of the bitmap vectors.

Further exemplary embodiments include a computer system configured to process an iceberg query in a database, the system including a memory element including the database that includes a plurality of bitmap vectors vertically organized in a bitmap index, a processor communicatively coupled to the memory element and configured to eliminate, by dynamic pruning, any of the plurality of bitmap vectors in the bitmap index that fails to meet a given condition thereby forming a subset of the plurality of bitmap vectors and align the vectors in the subset of the plurality of bitmap vectors in the bitmap index according to a respective position of each of the bitmap vectors in the subset of the plurality of bitmap vectors.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates an example of a bitmap index that can be implemented in accordance with exemplary embodiments;

FIG. 2A illustrates an example of a bit vector;

FIG. 2B illustrates another example of a bit vector;

DETAILED DESCRIPTION

Figure 3:
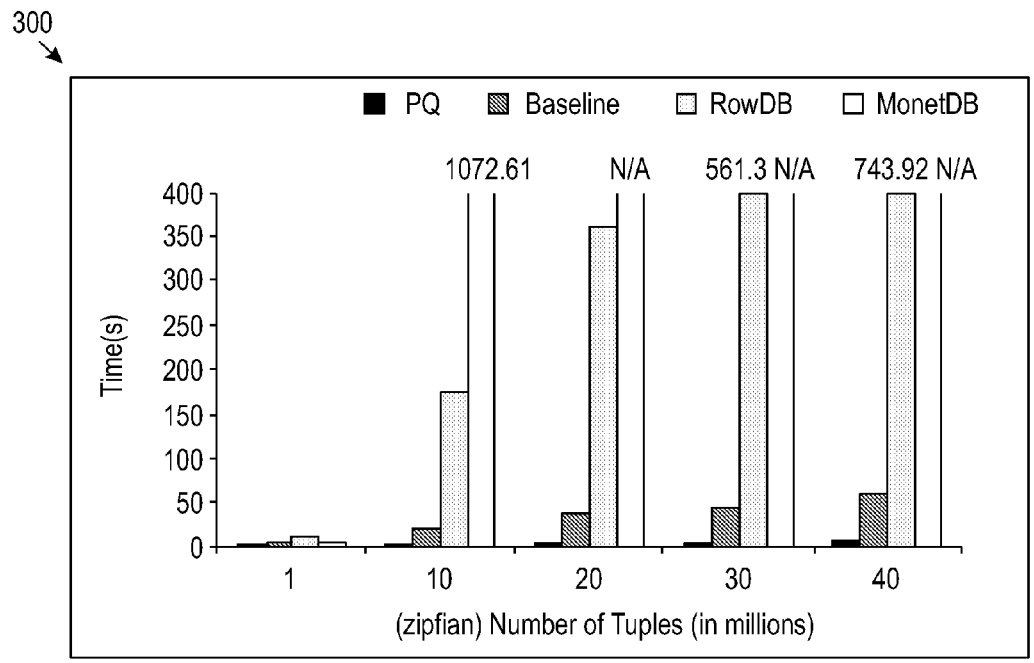
FIG. 3 illustrates a plot of time versus number of tuples illustrating performance on a zipfian distribution in accordance with exemplary embodiments.

In exemplary embodiments, the systems and methods described herein implement an index-pruning based approach for computing iceberg queries. In exemplary embodiments, the systems and methods described herein (implementing bitmap indices) build a vector for each unique value across all rows in a column, and implement pruning strategies for iceberg queries. By implementing bitmap indices and compression techniques, less memory is required and both row-oriented and column-oriented databases can be queried.

For purposes of illustration, a typical iceberg query may be implemented for warehouse space planning and product promotion purposes, in which market analysts for a store may want to analyze the relationships between Product and State in its Sales database. In particular, the analysts may be interested in products that are very popularly sold, say no less than 100K units in a state. This inquiry is a typical iceberg query. The query is SELECT Product, State, COUNT(*) FROM Sales GROUP BY Product, State HAVING COUNT(*)>=100000. As such an aggregation is performed on states and products with a COUNT function. Only (state, product) groups whose count numbers meet a 100K threshold are selected as the iceberg result. The iceberg query can be in the general format of an iceberg on a relation $R(C_1, C_2, \ldots, C_n)$ is defined as:

```
SELECT Ci, Cj, ..., Cm, COUNT(*)
FROM R
GROUP BY Ci, Cj, ..., Cm
HAVING COUNT(*) >= T
```

$C_i, C_j, \ldots, C_m$ represents a subset of attributes in R. SUM function that can also be applied in iceberg queries (e.g., for discovering high revenues with respect to products and states). Due to the threshold constraint T, iceberg queries usually only select a very small percentage of groups to output, and thus resemble tips of icebergs. Because of their small result sizes, it is expected that iceberg queries can be answered quickly even over very large databases. However, current database systems and algorithms are not very efficient in computing iceberg queries for large data. Current off-the-shelf relational database systems n (e.g., DB2, Oracle, SQL Server, Sybase, MySQL, PostgreSQL, and column databases Vertica, MonetDB, LucidDB) implement general aggregation algorithms to answer iceberg queries by first aggregating all tuples and then evaluating the HAVING clause to select the iceberg result. For large data, multi-pass aggregation algorithms are used when the full aggregate result cannot fit in memory (even if the final iceberg result is small). There also are algorithms designed specifically for processing iceberg queries. Their goal is to reduce the number of passes when the data is large with techniques such as sampling and bucketing. The existing techniques for computing iceberg queries can be categorized as the tuple-scan based approach, which requires at least one table scan to read data from disk and a significant amount of CPU time to compute the aggregation tuple-by-tuple. Such a tuple-scan based scheme often makes performance of iceberg queries unsatisfactory, especially when the table is big but the returned iceberg result set is very small. The aforementioned issues are inherent to tuple-scan based algorithms, since they cannot get the accurate aggregate result without reading and scanning through all the tuples.

In exemplary embodiments, the systems and methods described herein implement index-pruning to compute iceberg queries implementing bitmap indices of databases. A bitmap index provides a vertical organization of a column via bitmap vectors. Each vector includes occurrences of a unique value in the column across all rows in the table. Bitmap compression methods and encoding strategies further broaden the applicability of a bitmap index. A bitmap index can be applied on all types of attributes (e.g., high-cardinality categorical attributes, numeric attributes and text attributes). A compressed bitmap index occupies less space than the raw data and provides enhanced query performance for equal query, range query, and keyword query. In addition, bitmap indices are supported in many commercial database systems (e.g., Oracle, Sybase, Informix), and they are often the default index option in column-oriented database systems (e.g., Vertica, C-Store, LucidDB). Bitmap indices are often the only option for applications with read-mostly or append-only data, such as OLAP applications and data warehouses.

In exemplary embodiments, the bitmap index can also support efficient iceberg queries. As described herein, implementing a bitmap index avoids excessive disk access on tuples. Since a bitmap index is built on a per column basis, for an iceberg query, the systems and methods described herein access bitmap indices of the grouping attributes (i.e., the attributes in the GROUP BY clause), thereby avoiding accessing tuples. As described herein, disk access time is saved because a compressed bitmap index is smaller than the raw data. In addition, in row-oriented databases, tuples are stored according to rows. As such, in typical warehouse applications, an iceberg query only aggregates a few attributes on a table containing a large number attributes. As such, the query processor still has to read through all the columns in the table, which can be very expensive. Once again, disk access time is saved because a compressed bitmap index is smaller than the raw data.

In addition, a bitmap index operates on bits other than real tuple values. Typical iceberg query processing has a computation cost. Tuple-scan based algorithms need to deal with real tuple values, which are usually strings for grouping attributes. A bitmap index does not operate on values directly, because it uses bits to represent the existence of values. Bitwise operations quickly execute and can often be accelerated by hardware. As such, a bitmap index usually performs better than a tree-based index, such as the variants of B-tree or R-tree on warehouse applications.

Furthermore, a bitmap index leverages the monotone property of iceberg queries to enable aggressive pruning strategies. Iceberg queries have the monotone property because of the COUNT/SUM function. If the count of a group $c_1, \ldots, c_n$ meets the threshold T and is in the iceberg result, the count of any subset of $c_1, \ldots, c_n$ must also meet T. If the count of a value is below T, any group containing this value must be below T. This property can be utilized with a bitmap index to develop effective pruning strategies as described herein. Unlike tuple-scan based algorithms, where counting the aggregate function on a single value is not a simple task the aggregate function can be computed on a single value (using its vector) without accessing other vectors in bitmap index. This difference gives the bitmap index the advantage for efficiently leveraging the monotone property.

In exemplary embodiments, when using bitmap indexes to answer an aggregate query on attributes A and B, in a worst case, bitwise AND operations are computed between any A's vector, a, and B's vector, b, to check whether the group (a, b) meets the threshold. When the numbers of unique values of A and B are large, the number of their pairwise AND operations can be significantly larger than the total number of tuples in the table, that is, most of their AND results are empty (i.e., the bitwise AND result has no 1-bit and thus count 0). As described herein, the empty AND result can be dominating in the computations (e.g., 99.9% of AND results are empty). As such, the systems and methods described herein implement efficient algorithms and the characteristics of bitmap indices, and avoid bitwise AND operations that generate empty results. In addition, the systems and methods described herein detect whether a bitwise AND generates an empty AND result or at least performing computations before doing the AND operation. In exemplary embodiments, an efficient vector alignment algorithm aligns vectors according to their occurrences so that any bitwise AND operation does not generate an empty result. The vector alignment algorithm can be on the priority queue structure and further optimization strategies, tracking pointers and global filter vectors. By combining dynamic pruning and vector alignment, the exemplary embodiments described herein greatly improve the performance of iceberg query processing as compared to tuple-scan based techniques.

As described above, bitmap is a database index implemented in data warehousing applications and column stores. A bitmap for an attribute can be viewed as a v×r matrix, where v is the number of distinct values of this column (i.e., attribute) and r is the number of rows (i.e., tuples) in the database. Each value in the column corresponds to a vector of length r in the bitmap, in which the kth position is 1 if this value appears in the kth row, and 0 otherwise.

FIG. 1 illustrates an example of a bitmap index 100 that can be implemented in accordance with exemplary embodiments. The left part of FIG. 1 illustrates an example relation with a set of attributes. The right part of FIG. 1 illustrates the bitmap index of A. For each A's distinct value, there is a corresponding vector. The length of a vector is equal to the number of tuples in the table. For instance, the value a's vector is 10010010, because a occurs in the 1st, 4th, and 8th rows in the table. As an uncompressed bitmap is generally much larger than the original data, compression can be implemented for attributes other than the primary key to reduce storage size and improve performance. With compression, bitmaps perform well for a column with cardinality up to 55% of the number of rows, that is, up to 55% of rows have distinct values on this column.

With regard to compression, various compression methods for bitmaps can be implemented in accordance with exemplary embodiments. For example, Word-Aligned Hybrid (WAH) and Byte-aligned Bitmap Code (BBC) are compression schemes that can be used for any column and can be implemented in query processing without decompression. WAH can be as much as ten times faster than BBC, while occupying no more than 50% of disk space. Run length compression can be implemented for sorted columns. Although any compression method is contemplated, for illustrative purposes, WAH is described herein. WAH organizes the bits in a vector by words. A word can be either a literal word or a fill word, distinguished by the highest bit: 0 for literal word, 1 for fill word. L can denote the word length in a machine. A literal word encodes L−1 bits, literally. A fill word is either a 0-fill or a 1-fill, depending on the second highest bit, 0 for 0-fill and 1 for 1-fill. N is the integer denoted by the remaining L−2 bits, then a fill word represents (L−1)×N consecutive 0s or 1s. For example, the bit vector 200 shown in FIG. 2A is WAH-compressed into the vector 250 in FIG. 2B.

As described herein, the exemplary systems and methods implement a dynamic pruning-based algorithm. For illustrative purposes, the exemplary pruning based algorithm is described with respect to answering iceberg queries on multiple attributes using a bitmap index. However, it is contemplated that the pruning algorithm can also be applied to answering an iceberg query with a single attribute using a bitmap index. The pruning algorithm can further be extended to support more than two attributes. In addition, in exemplary embodiments, both COUNT and SUM aggregation functions are supported. For illustrative purposes, the COUNT aggregation function is described herein.

As described herein, iceberg queries have a monotone property such that for an iceberg query on multiple attributes $C1, \ldots, Cn$ with threshold T, if a group of values $c1, \ldots, cn$ ($c_i$ 2 $C_i$, for each i) is in the iceberg result, i.e., COUNT($c1, \ldots, cn$)>=T, we can derive COUNT($c_i$)>=T for any value $c_i$. The bitmap index can provide a vertical organization of a column using bitmap vectors. A vector contains occurrences of a unique value of a column across all rows, and can track the total occurrences of a single value without accessing other data.

In one example, given a value x in attribute A and a value y in attribute B, the aggregate count can be computed by conducting a bitwise AND operation on x's vector and y's vector as r=BITWISE AND(x.vector, y.vector), counting the number of 1s in r, and checking whether the count meets the threshold T. The BITWISE AND operation is specific to bitmap index compression methods, as described herein. Further, if COUNT(x)<T or COUNT(y)<T, then COUNT(x, y)<T and thus (x, y) cannot be an iceberg result, according to the monotone property of iceberg queries.

In exemplary embodiments, an algorithm for computing iceberg queries implementing the monotone property is given as the following pseudocode:

---

Algorithm 1 Naive Iceberg Processing icebergNaive (attribute A, attribute B, threshold T)
Output: iceberg results
1:        $V_A = \emptyset, V_B = \emptyset$
2:        for each vector a of attribute A do
3:            a.count = BIT1_COUNT(a)
4:            if a.count >= T then
5:                Add a into $V_A$
6:        for each vector b of attribute B do
7:            b.count = BIT1_COUNT(b)
8:            if b.count >= T then
9:                Add b into $V_B$
10:       R = $\emptyset$
11:       for each vector a in $V_A$ do
12:           for each vector b in $V_B$ do
13:               r = BITWISE_AND(a, b)
14:               if r.count >= T then
15:                   Add iceberg result (a.value, b.value, r.count) into R
16:       return R

---

For an iceberg query on two attributes A and B with threshold T, A's vectors are first read and the ones with count values less than T are ignored. The same process is performed on B's vectors. A function BIT1 COUNT is implemented to count the number of 1s in a vector. In exemplary embodiments, algorithms can be implemented to count the number of 1s in a bitmap vector, and to WAH-compressed vectors. All the remaining A and B vectors cannot be pruned by the monotone property. The BITWISE AND operation is then computed between each A's remaining vector and each B's remaining vector, and the AND result is verified to be in the iceberg result.

The algorithm, icebergNaive, leverages the monotone property in the first phase of reading attribute vectors (i.e., lines 1-9 of the pseudocode). The second phase of computing pairwise AND operations does not take advantage of the monotone property (i.e., lines 10-15), and may result in unnecessary AND operations. As such, it is possible that a vector, a, can be pruned after several AND operations with some B values and thus does not need to continue to furnish all the remaining AND operations.

In exemplary embodiments, the systems and methods described herein include a dynamic pruning algorithm icebergDP that implements the monotone property in both phases. The algorithm that implements the monotone property for both phases is given as the following pseudocode:

---

Algorithm 2 Iceberg Processing with Dynamic Pruning

---

```
icebergDP (attribute A, attribute B, threshold T)
Output: iceberg results
    1:     V_A = 0, V_B = 0
    2:     for each vector a of attribute A do
    3:         a.count = BIT1_COUNT(a)
    4:         if a.count >= T then
    5:             Add a into V_A
    6:     for each vector b of attribute B do
    7:         b.count = BIT1_COUNT(b)
    8:         if b.count >= T then
    9:             Add b into V_B
    10:    R = 0
    11:    while V A ≠ 0 and V B ≠ 0 do
    12:        a, b = chooseVectorPair(V_A, V_B)
    13:        r = BITWISE_AND(a, b)
    14:        if r.count >= T then
    15:            Add iceberg result (a.value, b.value, r.count) into R
    16:        a.count = a.count − r.count
    17:        b.count = b.count − r.count
    18:        if a.count < T then
    19:            Remove a from V_A
    20:        if b.count < T then
    21:            Remove b from V_B
    22:    return R
```

Phase 1 is the same as the algorithm icebergNaive. In Phase 2, after obtaining the AND result r of two vectors a, b, the counts of a and b are decreased by r's count. If any of their remaining count, which represents the number of 1 bits in the vector, is less than the threshold, the vector is removed to avoid unnecessary computations. Comparing icebergDP to icebergNaive, vectors can be dynamically pruned during AND operations (i.e., lines 16-21 of algorithm 2).

In the algorithm icebergDP, vectors can be ordered in VA and VB for AND operations to achieve optimal pruning effect. As illustrated in the pseudocode for the algorithm, a chooseVectorPair function is implemented to denote that different selection strategies can be explored (i.e., line 12 in algorithm 2). Possible strategies, which avoid selecting vector pairs that already are computed, include, but are not limited to: 1) Random selection; 2) Prefer vectors with the current highest counts; 3) Prefer vectors with the current lowest counts; 4) Prefer vectors with the highest initial counts; and 5) Prefer vectors with the lowest initial counts. In exemplary embodiments, because vector counts are dynamically changing, selecting the highest initial count can be implemented because vectors with high counts are probabilistically more likely to avoid empty AND results (i.e., the AND result has count 0) than vectors with low counts. As such, for illustrative purposes strategy 4) Prefer vectors with the highest initial counts, is implemented for ordering vectors in VA and VB for AND operations.

The algorithm icebergDP implements dynamic pruning of bitmap indexes for attributes with a small number of unique values. For a large number of unique values in attributes, the algorithm icebergDP can generate massive empty AND results. With the number of unique values being large, it is very likely that most AND operations of two vectors have empty results. As such, the AND computations are wasted, as they neither generate iceberg results nor contribute to dynamic pruning. For example, if a table has 100,000 tuples, its attribute A has 10,000 unique values, and attribute B has 10,000 unique values. Thus, there are 10,000 bitmap vectors for A and 10,000 for B. In the worst case, the total number of pairwise AND operations is 10,000×10,000=100,000,000, which is 1,000 times larger than the number of tuples. About 99.9% of AND operations have empty results.

Although a single AND operation typically requires a relatively short amount of computing time, an increasing number of vain AND operations becomes a dominating factor in the execution time and significantly degrades performance. The dominating massive empty AND results may negate benefits from dynamic pruning and choosing chooseVectorPair strategies. As such, an algorithm can be further developed that takes advantage of dynamic pruning, and also avoids empty AND results. The algorithm at the judges whether two vectors have empty AND result without actually performing the AND operation. In exemplary embodiments, the algorithm can guarantee that two vectors for the AND operation overlap at least once. The technique implemented in the algorithm is referred to as vector alignment, which means vectors are aligned according to their positions to avoid empty AND results.

In exemplary embodiments, the systems and methods herein can implement iceberg query processing with vector alignment via priority queues. For each group attribute, all remaining vectors (after the initial pruning using the threshold T) are placed into the priority queue. For each vector, its priority is defined as the position of the first "untouched 1" in the vector. Given a bitmap vector vec, its untouched 1 positions refer to a list of positions of 1 bits in vec, where the 1 bits are not in the results of any AND operation that has been processed at the present. The "first untouched 1" refers to the 1 bit with the smallest position (i.e., the leftmost untouched 1 in the vector). For example, referring to the bitmap vectors for b and y in FIG. 1, after a bitwise AND operation between the two bitmap vectors, the result is a new vector with 2nd and 6th positions being 1. The 1-bits at the two positions of the bitmap vector for b and y become touched 1s. As such, for y, before the AND operation, the first untouched 1 in the bitmap vector is at the 2nd position. After the bitwise AND, the first untouched 1 is the 1-bit at the 3rd position.

In exemplary embodiments, the bitwise AND operation finds the first untouched 1 in addition to the AND operation. Given two vectors b and y, when their AND operation is computed, for any overlapping bit, the bit is not only put into the result vector, but the original bits in b and y are also changed to 0. As such, all the 1 bits in vectors b and y are untouched. In addition, finding the first untouched 1 becomes finding the first 1-bit in a vector.

In exemplary embodiments, an algorithm, icebergPQ, combining priority queue based vector alignment and dynamic pruning is given as the following pseudocode:

---

Algorithm 3 Iceberg Processing with Vector Alignment and Dynamic Pruning

---

```
icebergPQ (attribute A, attribute B, threshold T)
Output: iceberg results
    1:     PQ_A.clear, PQ_B.clear
    2:     for each vector a of attribute A do
    3:         a.count = BIT1_COUNT(a)
    4:         if a.count >= T then
    5:             a.next1 = firstUntouched1(a, 0)
    6:             PQ_A.push(a)
    7:     for each vector b of attribute B do
```

-continued

Algorithm 3 Iceberg Processing with Vector Alignment and Dynamic Pruning

```
 8:        b.count = BIT1_COUNT(b)
 9:        if b.count >= T then
10:           b.next1 = firstUntouched1(b, 0)
11:           PQ_B.push(b)
12:     R = ∅
13:     a, b = nextAlignedVectors(PQ_A, PQ_B, T)
14:     while a ≠ null and b ≠ null do
15:        PQ_A.pop
16:        PQ_B.pop
17:        r = BITWISE_AND2(a, b)
18:        if r.count >= T then
19:           Add iceberg result (a.value, b.value, r.count) into R
20:        a.count = a.count − r.count
21:        b.count = b.count − r.count
22:        if a.count >= T then
23:           a.next1 = firstUntouched1(a, a.next1 + 1)
24:           if a.next1 ≠ null then
25:              PQ_A.push(a)
26:        if b.count >= T then
27:           b.next1 = firstUntouched1(b, b.next1 + 1)
28:           if b.next1 ≠ null then
29:              PQ_B.push(b)
30:        a, b = nextAlignedVectors(PQ_A, PQ_B, T)
31:     return R
```

As with the previously discussed algorithms, the algorithm icebergPQ, also includes two phases. In the first phase, a priority queue is built for each attribute using positions of first untouched 1 as vector priorities (i.e., lines 1-11 in algorithm 3). The function firstUntouched1 is to find the position of the first untouched 1, starting from a given position. The initial starting position is 0, because in the first phase all the 1 bits in vectors are untouched. In exemplary embodiments, the firstUntouched1 function is specific to the bitmap compression scheme. Algorithm 4 illustrates an implementation of the firstUntouched1 function on vectors with WAH compression, for which the following is pseudocode:

Algorithm 4 Find First Untouched 1

```
firstUntouched1 (bitmap vector vec, start position pos)
Output: the position of the first untouched 1 in vec, starting from
position pos
 1:     len = 0
 2:     for each word w in vector vec do
 3:        if w is a literal word then
 4:           if len <= pos AND len + 31 > pos then
 5:              for p = pos to len + 30 do
 6:                 if position p is 1 then
 7:                    return p
 8:           else if len > pos then
 9:              for p = len to len + 30 do
10:                 if position p is 1 then
11:                    return p
12:           len += 31
13:        else if w is a 0 fill word then
14:           fillLength = length of this fill word
15:           len += fillLength * 31
16:        else
17:           fillLength = length of this fill word
18:           len += fillLength * 31
19:           if len > pos then
20:              return pos
21:     return null
```

In exemplary embodiments, the systems and methods described herein scan each word in a WAH-compressed vector, and compute the current bitmap position (i.e., the len variable) according to literal word or 0/1 fill word. When the len value is no less than the given starting position pos, we find the first 1 bit and return its position. The firstUntouched1 function can be implemented for any bitmap compression method and for any compressed bitmap index. As further described herein, general optimization techniques can be applied to the function so that the scanning from the beginning of a vector each time, can be avoided.

In exemplary embodiments, the second phase of algorithm icebergPQ (lines 12-30 in algorithm 4) leverages the same dynamic pruning strategy as in algorithm icebergDP. In exemplary embodiments, a vector alignment algorithm is implemented to find aligned vectors using the priority queues (i.e., the nextAlignedVectors function), as further described herein. In addition, the bitwise AND operation (i.e., the BITWISE AND2 function in line 15 of algorithm 4) performs the AND function as well as setting the touched 1-bits in the original vectors to 0 to help the firstUntouched1 function to correctly find the first untouched 1. In addition, optimization techniques can also be applied to this function. Furthermore, when AND operations start, some bits may become touched and thus the positions of the first untouched 1 may change. Therefore, after the AND operation of two vectors a and b is done, if any of them cannot be pruned, the unpruned vector is pushed back to the priority queue with an updated position of its new first untouched 1 (lines 22-29 of algorithm 4). The functionfirstUntouched1 is then implemented again, and the search starts from 1+position of current first untouched 1.

Algorithm 5 illustrates the algorithm of vector alignment for which the following is the pseudocode:

Algorithm 5 Find Next Aligned Vectors

```
nextAlignedVectors (priority queue PQ_A, priority queue
PQ_B, threshold T)
Output: two aligned vectors a ∈ PQ_A, b ∈ PQ_B
 1:     while PQ_A is not empty and PQ_B is not empty do
 2:        a = PQ_A.top
 3:        b = PQ_B.top
 4:        if a.next1 = b.next1 then
 5:           return a, b
 6:        if a.next1 > b.next1 then
 7:           PQ_B.pop
 8:           b.next1, skip = firstUntouched1WithSkip(b, a.next1,
                 b.next1)
 9:           b.count = b.count − skip
10:           if b.next1 ≠ null AND b.count >= T then
11:              PQ_B.push(b)
12:        else
13:           PQ_A.pop
14:           a.next1, skip = firstUntouched1WithSkip(a, b.next1,
                 a.next1)
15:           a.count = a.count − skip
16:           if a.next1 ≠ null AND a.count >= T then
17:              PQ_A.push(a)
18:     return null, null
```

In exemplary embodiments, given two priority queues PQA and PQB, the top vectors a from PQA and b from PQB are analyzed. If their priorities are the same, they at least overlap once and do not generate an empty AND result. They are then returned as a pair of aligned vectors (lines 2-5 in algorithm 5). It is possible that priorities of the two top vectors are different, as some vectors may have been pruned. As such, the systems and methods described herein continue to find aligned vectors with priority updates and queue operations. For instance, if the priority of a is larger than the one of b (i.e., a.next1>b.next1), the vector in A which matches the position b.next1 has been pruned. As such, b is pushed back to PQB with an updated larger untouched 1 position (lines 6-11 in algorithm 5). For the other situation b.next1>a.next1, a is pushed back to PQA with updated untouched position (lines 13-17 of algorithm 5). This process repeats until an aligned pair of vectors are found or one queue is empty.

Algorithm 5 includes conditions a.next1>b.next1, and b.next1>a.next1. When b is pushed back to PQB, b's position of the new untouched 1 can be computed by finding b's next first untouched 1 after its current untouched 1. But it is possible that b's next first untouched 1 is still smaller than a.next1. As a result, b would have to be processed again and the first queue push operation is wasted. The condition a.next1>b.next1 already indicates that any b's 1 bit in the position range [b.next1, a.next1) has no match in a and can be skipped. Therefore, instead of searching from b's current untouched 1, b's first untouched 1 from a's current untouched 1 is found to avoid invalid queue pushing. In addition, optimization strategies can be performed to substantially reduce invalid queue pushing, as described herein. In exemplary embodiments, the systems and methods described herein can count the number of 1 bits of vector b in position range [b.next1, a.next1), as those bits are not useful. This count can be deducted from b's count. If b's new count is less than the threshold, b can then be pruned. If b has next the first untouched 1 and still cannot be pruned, b can be pushed back to PQB (lines 6-11 in Algorithm 5). The function firstUntouched1 WithSkip returns two values: b's new untouched 1 position since a.next1 position and the count of b's is in position range [b.next1, a.next1). Lines 13-17 in algorithm 5 handle the other condition b.next1>a.next1 in the same way. The function firstUntouched1 WithSkip is implemented by slightly revising the function firstUntouched1 in Algorithm 4, in which counting and returning the number of 1s in a given position range are added.

In exemplary embodiments, icebergPQ provides an efficient algorithm for effective pruning as now described. Given a table S(A;B) with n tuples, A can have s unique values, B can have t unique values, and grouped by operation on A, B, which forms g groups. Here, g represents the number of valid groups that appear at least once in the relation. In addition, s<=g<=n and t<=g<=n. As described above, however, s×t could be much larger than n for big s and t values. Theoretically, the worst case of icebergDP compares any pair of vectors in the two attributes, if no dynamic pruning is effective. Hence, the worst case performance of icebergDP can be s×t, which could be much slower than scanning the table itself. In this case, AND operations can dominate over dynamic pruning. However, icebergPQ only processes AND operations on aligned vectors. That is, each AND operation corresponds to a real group on A, B. Therefore, the worst case of icebergPQ can be equal to the number of groups g, which is often much smaller than the table size n. The effect of pruning becomes quite significant in icebergPQ, since it makes the number of AND operations even much smaller than g in practice. Furthermore, the optimization strategy described herein can further reduce the execution time of AND operations.

The overhead of icebergPQ for the maintenance of priority queues in terms of push and pop operations can be given as: $O((n-pA-kA-r) \times \log(s-pA)+(n-pB-kB-r) \times \log(t-pB))$, where pA (pB) is the number of A's (B's) vectors pruned by the threshold in the first phase when building priority queues, kA (kB) is total number of skipped 1 bits in the vector alignment Algorithm 5 for A's (B's) priority queue, and r is the total number of 1-bit positions that are updated to 0s in the BITWISE AND2 function of algorithm icebergPQ. Vector pruning can affect queue maintenance in many ways. The initially pruned bit (i.e., pA, pB) and skipped bits (i.e., kA, kB) can reduce queue operations. In addition, the more vectors are pruned, the more likely invalid queue pushing can occur when re-pushing a vector back to its queue, because it is more likely that the vector's new untouched 1 cannot find a match in the other attribute's vectors. For some situations queue operation might be the dominating factor in the running time. In particular, the skipped values kA, kB can be a small percentage of the total dynamically pruned 1 bits. The optimization strategy described herein can avoid invalid queue pushing. With the optimization strategy, the worst case performance of queue maintenance can be $O((n-d-r) \times \log(s-pA)+(n-d-r) \times \log(t-pB))$, where d is the total number of all pruned 1-bit positions for attributes A and B in both phases. Since covering all attributes and phases, d is often much larger than pA+kA, and pB+kB. With this optimization, the dynamic pruning improves queue maintenance.

The exemplary optimization technique is now discussed. As described herein, the algorithm icebergPQ can process attributes with large number of unique values. Exemplary optimization strategies that can further improve the performance of icebergPQ include, but are not limited to: 1) Implementing tracking pointers to shorten the execution time of vector relevant operations, and 2) Implementing a global filter vector to reduce futile queue pushing. The exemplary algorithms described herein have been illustrated with respect to two grouping attributes. In exemplary embodiments, the algorithms can be extended to support more than two attributes.

The optimization strategy that involves shortening vector operations with tracking pointers is now discussed. The bitwise AND operation in the exemplary algorithms can start from the first bits of the two vectors. However, other starting points can be implemented with the priority queue based algorithm icebergPQ. For two vectors selected by the vector alignment algorithm, the AND operation can start from the position of the first untouched 1, because within each vector, the bits before the first untouched 1 have been processed and can be skipped. Therefore, a tracking pointer can be implemented for each vector to point to the memory location containing the first untouched 1 (i.e., it is a memory pointer pointing to the middle of a bitmap vector), and pass the pointers to the bitwise AND function. A bitwise AND operation can start from the location to which the tracking pointer points, and thus the execution time can be shortened. During algorithm execution, tracking pointers are gradually closer to the ends of vectors and thus save more and more execution times on AND operations. The same tracking pointers can also be used to shorten the execution time of the firstUntouch1 function (Algorithm 4) and the firstUntouch1WithSkip function. The firstUntouch1 function in Algorithm 4 always starts from the first bit of the vector to find the next first untouched 1. With the tracking pointer, the algorithm can directly start from the location containing the first touched 1, and thus not implement the pos parameter. As the bitwise AND function and firstUntouch1 function are both frequently executed by icebergPQ, the tracking pointer optimization can save execution time.

The optimization strategy that involves reducing futile queue pushing with a global filter vector is now discussed. As described above, futile queue pushing occurs when the first untouched 1 in a vector of an attribute is found, but the corresponding aligned vector in the other attribute has already been pruned. When many of vectors are pruned, the futile queue pushing problem becomes quite frequent and can impact the performance. In exemplary embodiments, to reduce futile queue pushing as much as possible, a global filter vector, a bitmap vector, is implemented to record the 1-bit positions that have been pruned across all the vectors.

When the firstUntouched1 function looks for the first untouched 1, it also checks whether the corresponding position in the global filter vector is marked as not being pruned. The global filter vector helps avoid many unnecessary push and pop operations, and thus can achieve performance gain.

As described above, the algorithm icebergPQ can be extended to support iceberg queries on more than two attributes. Because iceberg queries have the monotone property, when there are multiple aggregate attributes, two attributes can be processed at a time. The iceberg results of two attributes are a set of vectors passing the threshold. These vectors can be viewed as an intermediate aggregate attribute to further participate into another iceberg query processing. This procedure can be repeated until all attributes are processed. In exemplary embodiments, this algorithm is referred to as icebergPQMulti. By implementing icebergPQMulti, only vectors of two attributes are kept in memory regardless of the total number of aggregate attributes, resulting in enhanced space efficiency.

In exemplary embodiments, the attributes that can generate the smallest number of iceberg results when first processed, because if the intermediate iceberg is small, the subsequent iceberg processing should be more efficient. It can be difficult to know the exact iceberg size before doing the processing. As such a simple greedy strategy can be implemented. If an attribute has more unique values, each unique value has a lower count in the average and is more likely to be pruned. Thus, the systems and methods described herein sort attributes according to their numbers of unique values in descending order. The first two attributes are selected to process in the first iteration. The intermediate result is further processed together with the third attribute in the sorted list. This process is repeated.

EXAMPLES

In the examples, the performance of the icebergPQ algorithm, with the optimization techniques incorporated, is evaluated. The icebergPQ algorithm is compared with commercial row oriented and column oriented database systems, and an optimal baseline implementation of the tuple-scan based approach. To illustrate the effectiveness of vector alignment, icebergPQ is compared to icebergDP. The algorithms and systems are tested in terms of various factors such as data sizes, attribute value distributions, iceberg thresholds, number of attributes in the table, attribute lengths, and number of distinct values over both large real data sets and synthetically generated data sets. The experiments illustrate that icebergPQ is efficient compared to existing commercial row oriented and column oriented database systems and the optimal baseline algorithm on data sets with the zipfian distribution, a representative distribution for real data. The icebergPQ algorithm also shows comparable performance for other distributions such as normal distribution and uniform distribution. Furthermore, the number of attributes in the table and attribute lengths have no impact on icebergPQ. The algorithm also scales well with respect to data sizes, iceberg thresholds and number of distinct values.

The experiments are conducted on a machine with a Pentium 4 single core processor of 3.6 GHz, 2.0 GB main memory and 7200 rpm IDE hard drive, running Ubuntu 8.10 with kernel 2.6.27.9. Both algorithms icebergPQ and icebergDP are implemented in C++. In one implementation, the Linux ext3 file system is implemented. The buffer and disk management, which is usually used in DBMSs is not implemented. For comparison purposes, a commercial row oriented database system (i.e., RowDB in the experiment) and a popular column oriented database, MonetDB are selected. The unnecessary features (e.g., logging, constraint checking) are disabled in those systems for proper comparison. In addition, only one query instance is run on the machine when processing queries. Furthermore, a stand alone optimal baseline algorithm for tuple-scan based algorithm is also implemented. The baseline algorithm is a one-pass hash-based aggregation algorithm with iceberg selection implemented also in C++. One-pass on a disk is the minimal disk access cost of a tuple-scan based approach, which is an efficient aggregation strategy when there is enough memory. The baseline algorithm assumes that there is infinite memory to hold all values. This algorithm can be the fastest implementation that a tuple-based approach can achieve and thus it is implemented as the baseline of all tuple-based algorithms.

In the following Figures, the icebergPQ algorithm is denoted as PQ, the icebergDP algorithm is denoted as Pruning, the row oriented database is denoted as RowDB, MonetDB is denoted as MonetDB, and the baseline algorithm is denoted as Baseline. The experiments generate large synthetic data according to five parameters: data size (i.e., number of tuples), attribute value distributions, number of distinct values, number of attributes in the table, and attribute lengths. In each experiment, the impact of one parameter is focused with respect to data sizes and thus the other parameters are fixed. The synthetic data sizes vary from 1 million to 40 million. A relation in a patent database is implemented as real test data. The patent relation contains 25 million tuples, with a total size of 29 GB.

In the experiments, the performance of PQ, RowDB, MonetDB and Baseline for iceberg query processing was tested on real and synthetic data sets. For the real data set, since the parameters of the data set cannot be controlled (e.g. number of attributes, value distribution), these systems are tested with different sizes of the patent data set. For the synthetic data set, the systems are tested with respect to attribute value distributions.

For all the tests conducted, some of the systems run for a long time (i.e., up to several hours) and still do not terminate, in some cases. Therefore, for cases that run more than half an hour, the execution of the system is manually stopped, and the cases are denoted as N/A in all the figures. For cases whose running time is too long compared with other systems, the running time is placed on the corresponding bar in the figures.

Aggregation algorithms should not be affected by value distributions. However, optimizations specific for iceberg queries can be sensitive to values distribution, and usually only perform well for zipfian distribution. Therefore, the performance of the exemplary algorithms are examined under various value distributions.

Figure 4:
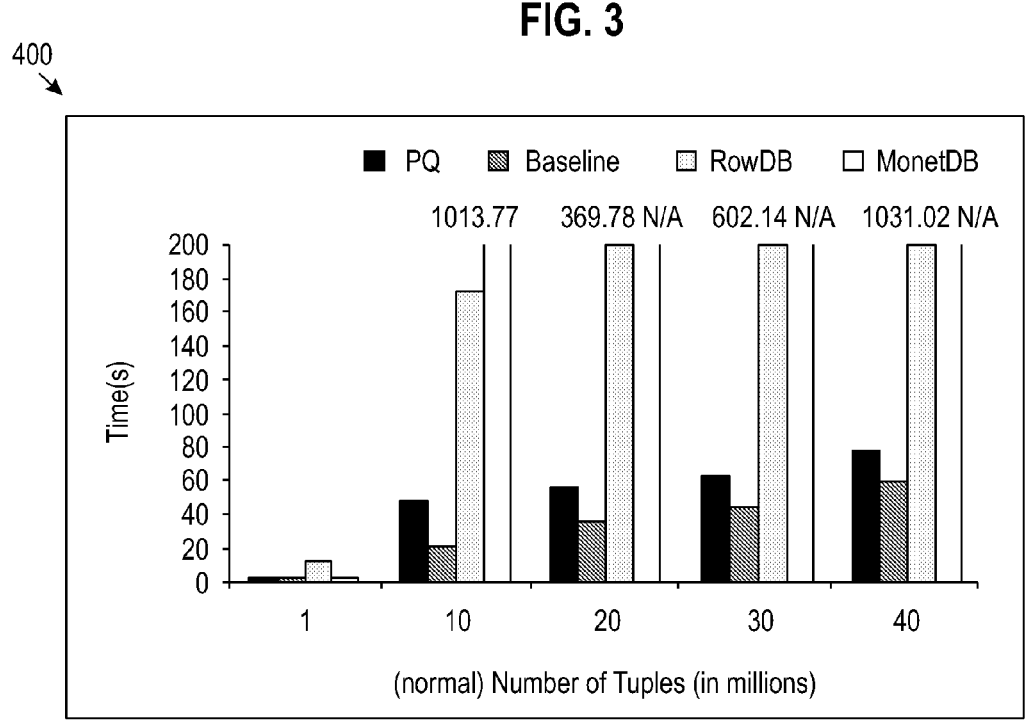
FIG. 4 illustrates a plot of time versus number of tuples illustrating performance on a normal distribution in accordance with exemplary embodiments.
Figure 5:
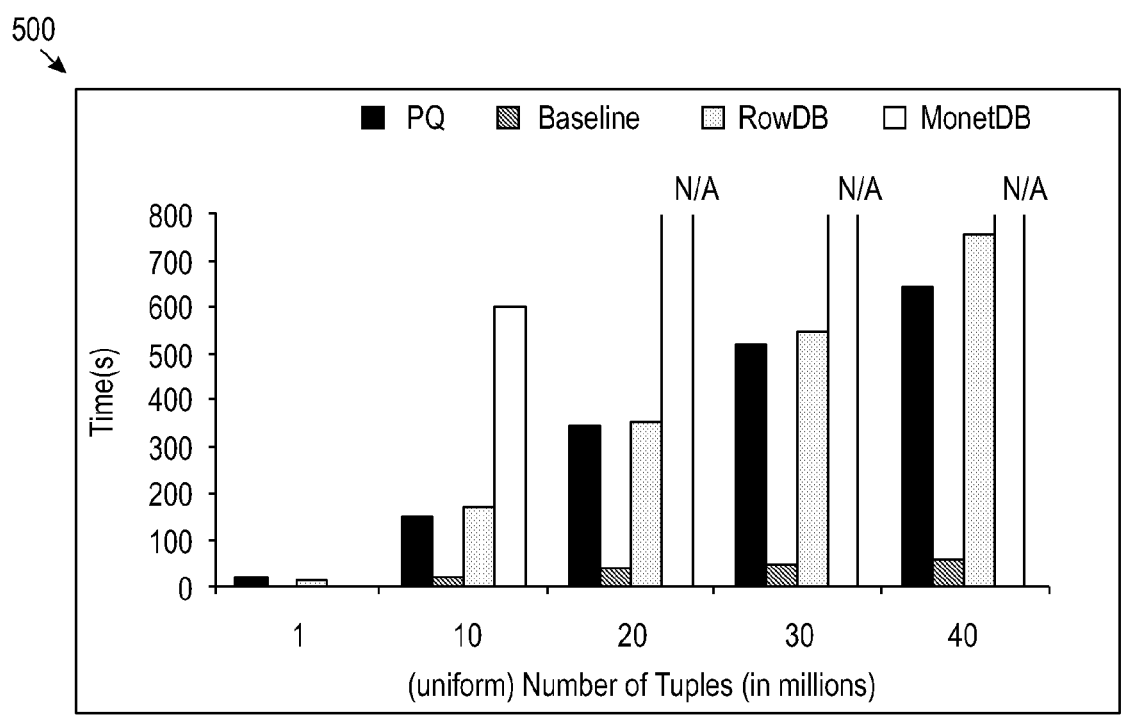
FIG. 5 illustrates a plot of time versus number of tuples illustrating performance on a uniform distribution in accordance with exemplary embodiments.

Data sets for three representative but different distributions (zipfian, normal and uniform) are generated. For each distribution, table sizes are varied from 1 million to 40 million tuples. The generated table R contains only two attributes A and B, where both have the CHAR(10) data type and follow the same value distribution. In all data sizes and value distributions, attribute A has 600,000 distinct values, and B has 300,000 distinct values. FIG. 3 illustrates a plot 300 of time versus number of tuples illustrating performance of all three algorithms and systems for iceberg query processing on a zipfian distribution in accordance with exemplary embodiments. FIG. 4 illustrates a plot 400 of time versus number of tuples illustrating performance of all three algorithms and systems for iceberg query processing on a normal distribution in accordance with exemplary embodiments. FIG. 5 illustrates a plot 500 of time versus number of tuples illustrating performance of all three algorithms and systems for iceberg query processing on a uniform distribution in accordance with exemplary embodiments.

The experimental results illustrate that algorithm icebergPQ achieves the best performance relative to the other two algorithms and illustrates scalability in zipfian distribution. In almost all data sizes, icebergPQ is 2 to 8 times faster than the optimal baseline algorithm, and 20 to 100 times faster than RowDB and MonetDB. For instance, for 30 million tuples, icebergPQ uses 5.282 seconds, while Baseline takes 43.98 seconds, RowDB takes 561.3 seconds, and MonetDB cannot finish in 1 hour. The icebergPQ algorithm also scales very well for zipfian distribution. The running time for the icebergPQ algorithm increases from 1.3 to 3.69 seconds, when the number of tuples increases from 1M to 10M. The running times of other systems and algorithms increase by more than 10 times, which is a reasonable observation for the tuple-scan based approach. As zipfian distribution is often considered as the representative distribution for real data, this example illustrates that the icebergPQ algorithm has superior performance as compared to convention iceberg algorithms.

In this example, the Baseline algorithm is often much faster than RowDB and MonetDB. RowDB implements a sorting based algorithm to compute aggregations even for one-pass aggregation. The extra effort on sorting the data significantly adds computation time. But in practice, this solution is more memory-efficient, compared to hash based algorithms. The performance of MonetDB under 1M tuples is often reasonably faster than the RowDB, but when it handles more than 10M data, its execution time deteriorates sharply, illustrating that MonetDB has scalability problems.

For data sets under other value distributions, icebergPQ also demonstrates reasonable performance and linear scalability. For normal distribution, as FIG. 4 illustrates, icebergPQ performs better than RowDB and MonetDB. The algorithm icebergPQ performed slower than the Baseline algorithm for normal distribution. However, the Baseline algorithm has the assumption of infinite memory, which is not applied in practice. For uniform distribution, the pruning power of icebergPQ is not as effective any more, because data is so evenly distributed. As such, icebergPQ shows the worst performance among the three distributions, but its performance is still comparable with RowDB and is better than MonetDB. In this case, the Baseline algorithm has the best performance as it is insensitive to value distributions. However, those skilled in the art appreciate that uniform distribution is rarely seen in real data.

Figure 6:
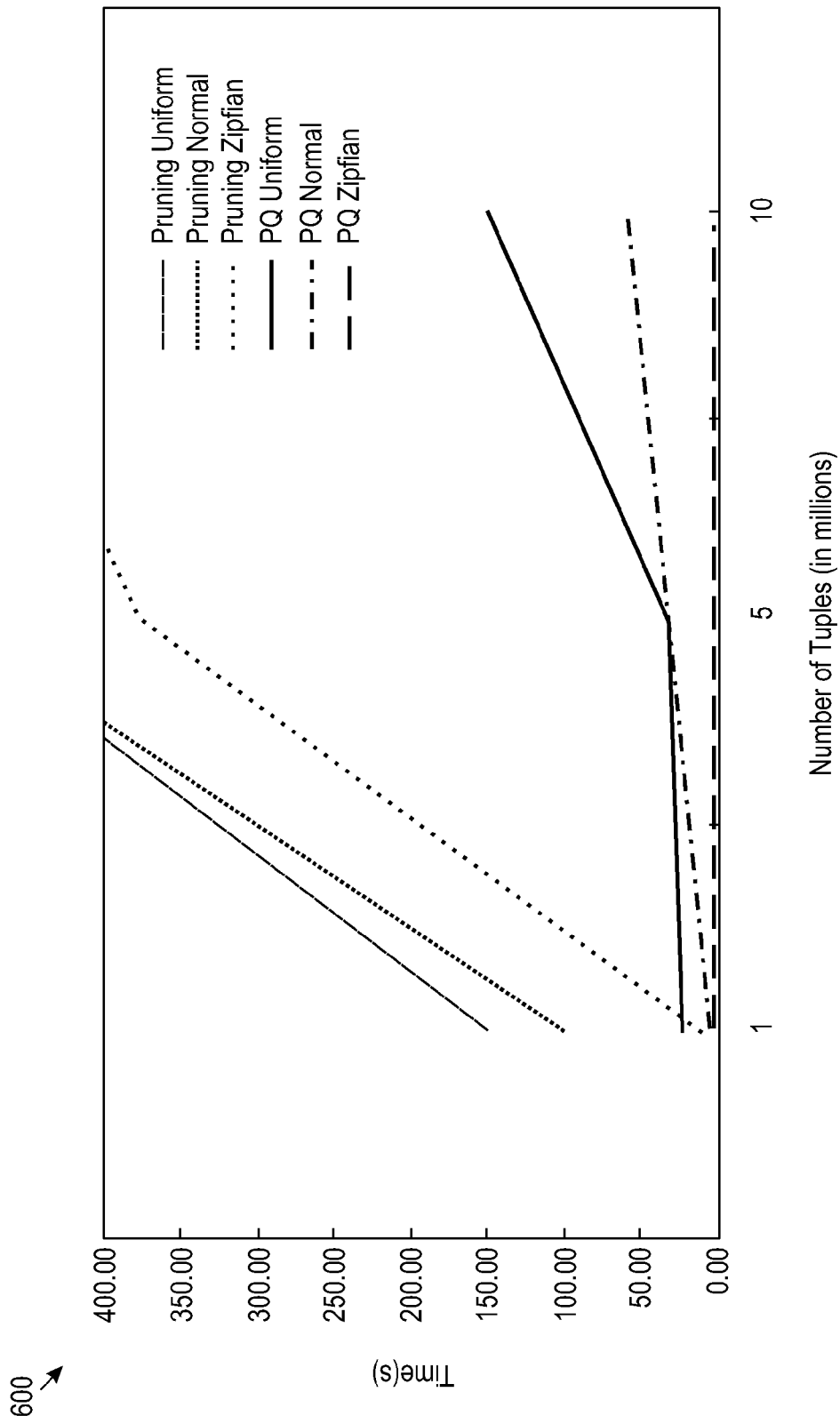
FIG. 6 illustrates a plot of time versus number of tuples illustrating performance of icebergPQ and icebergDP in accordance with exemplary embodiments.

The examples also compare the icebergPQ algorithm with icebergDP (Algorithm 2) on all three distributions with different data sizes. FIG. 6 illustrates a plot 600 of time versus number of tuples illustrating performance of icebergPQ and icebergDP. FIG. 6 illustrates that icebergPQ signicantly outperforms icebergDP, and is much more scalable. The algorithm icebergDP performs well when the data size is small, due to its effective pruning schemes. However, with the increase of data size, the performance of icebergDP degrades due to increasing number of futile bitwise AND operations. The example illustrates that the problem of massive "empty AND results" can be a bottleneck for icebergDP, and the effect of vector alignment in algorithm icebergPQ avoids the problem.

Figure 7:
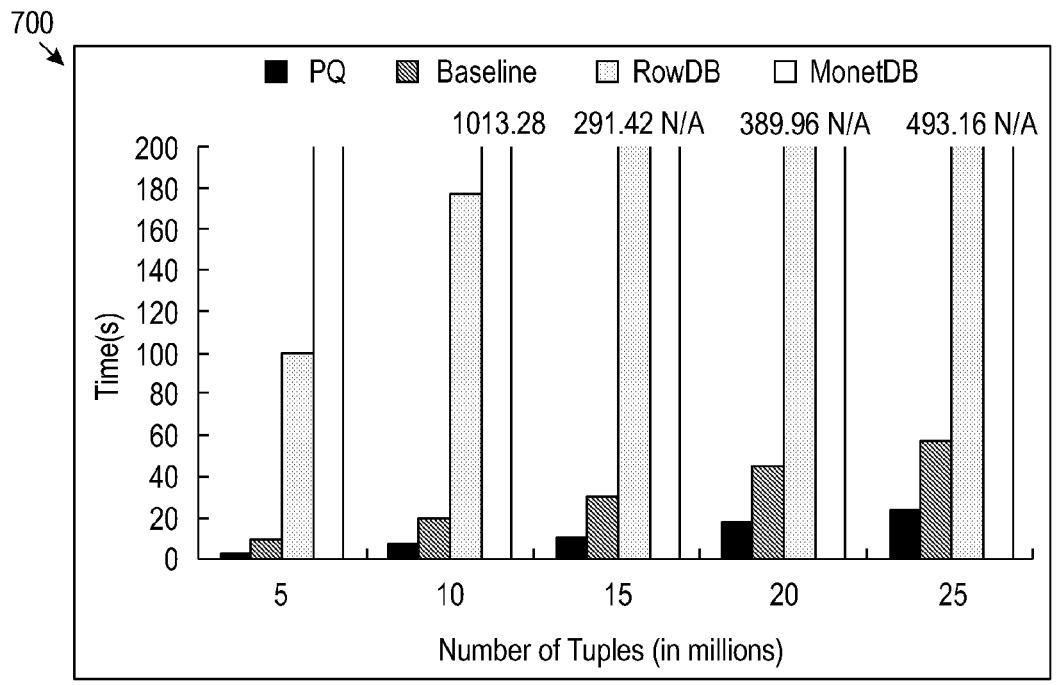
FIG. 7 illustrates a plot of time versus number of tuples illustrating performance of all three algorithms and systems for iceberg query processing on the patent data set in accordance with exemplary embodiments.

As discussed above, the performance of all the algorithms is tested on a real patent data set. The patent data set includes one relation, which has eight attributes, including firstname, lastname, state and city. The algorithms are tested with patent data set sizes varying from 5 million to 25 million. The result on the real patent data set is illustrated in FIG. 7, which illustrates a plot 700 of time versus number of tuples illustrating performance of all three algorithms and systems for iceberg query processing on the patent data set in accordance with exemplary embodiments. The icebergPQ algorithm, which is denoted as PQ, has the best performance among all the systems. The icebergPQ algorithm runs even faster than the optimal baseline algorithm. In addition, with the increase of data size in patent data set, icebergPQ scales well with respect to the increase of data size. The difference of running time between icebergPQ and baseline increases while the data size increase. Compared with the RowDB and MonetDB, icebergPQ presents significant performance advantage.

The examples illustrate the effectiveness of the icebergPQ algorithm, especially for zipfian value distributions. In the following examples, one parameter is varied each time to study the performance of icebergPQ. The icebergPQ algorithm is also compared to others under different parameters settings. The data set implemented in this set of experiments is a relation with 10 million tuples with zipfian value distributions. Unless specially mentioned, there are two attributes, A and B, in the relation. Attribute A has 600,000 distinct values and B has 300,000.

Figure 8:
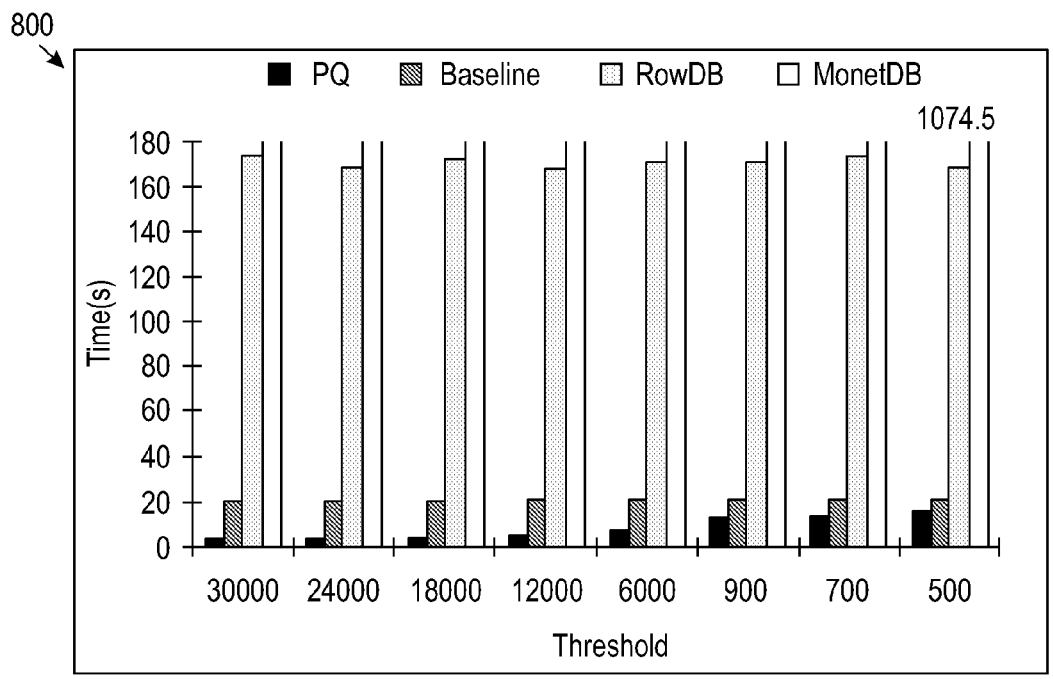
FIG. 8 illustrates a plot of time versus threshold illustrating performance of all three algorithms and systems for iceberg query processing on the patent data set in accordance with exemplary embodiments.

At first, the iceberg threshold T of the iceberg query is lowered gradually from 30000 to 500. FIG. 8 illustrates a plot 800 of time versus threshold illustrating performance of all three algorithms and systems for iceberg query processing on the patent data set in accordance with exemplary embodiments. Even if the threshold is lowered, icebergPQ still shows the best performance among all the algorithms. For instance, it only takes 15.267 seconds when the threshold is 500. Also, the icebergPQ algorithm only shows a small time increase when the threshold decreases sharply. When the threshold reduces from 30000 to 500 (60 times smaller), the processing time increases from 3.69 to 15.267 (only 4 times longer). The size of the iceberg result is 483 with threshold 500, and is 328 with threshold 700. These results are already pretty big iceberg tips from the perspective of user analysis. Other systems and algorithms are insensitive to the threshold, and thus keep the same performance in all cases. The Baseline algorithm is still the closest to icebergPQ.

Figure 9:
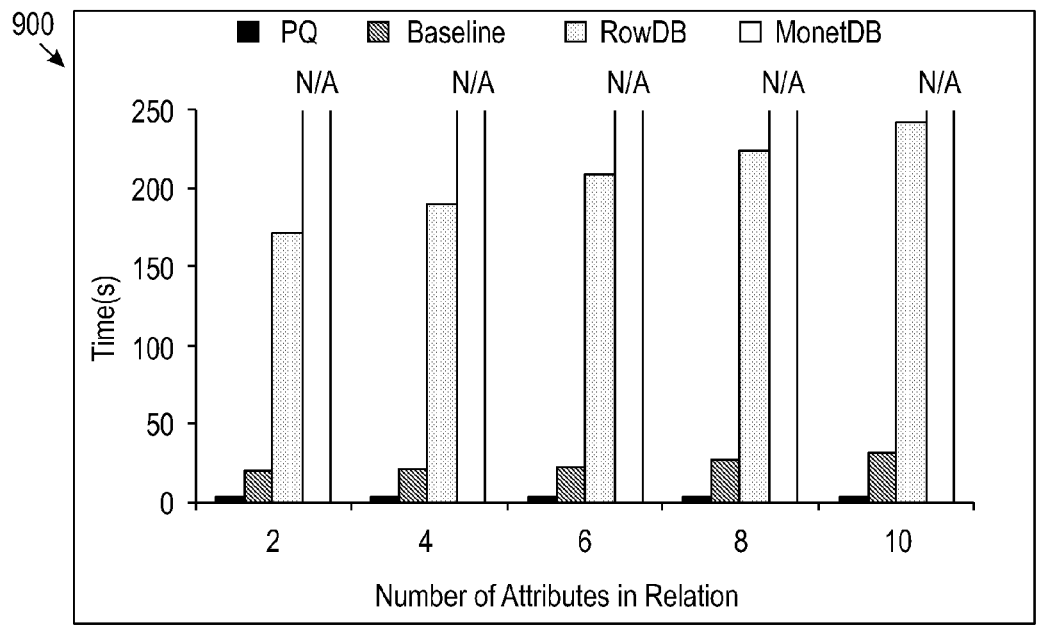
FIG. 9 illustrates a plot of time versus number of attributes in relation illustrating performance of all three algorithms and systems for iceberg query processing on the patent data set in accordance with exemplary embodiments.

Next, the number of attributes in the relation is changed. Unlike column oriented databases, for row-oriented databases, a complete tuple needs to be read from disk, even if only a small part of the tuple is used in the computation. Therefore, the performance of row-oriented databases degrades with the increase of number of attributes in a relation when computing iceberg queries. FIG. 9 illustrates a plot 900 of time versus number of attributes in relation, illustrating performance of all three algorithms and systems for iceberg query processing on the patent data set in accordance with exemplary embodiments. As shown in FIG. 9, the performances of RowDB and Baseline show a linear increase in processing time with respect to the increase of the number of attributes in the relation. On the contrary, the performance of icebergPQ stays the same because it only accesses bitmap indexes of attributes involved in the iceberg query. The examples only vary the number of attributes from 2 to 10. Real data warehouse may have 100 or more attributes, in which case the performance gain can be more significant using bitmap indexes.

Figure 10:
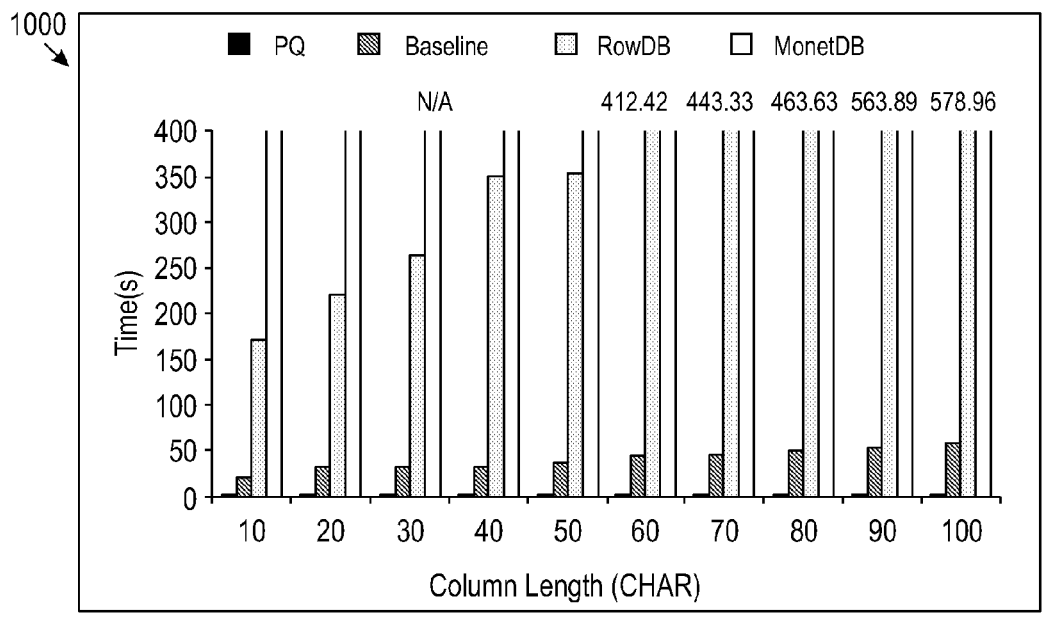
FIG. 10 illustrates a plot of time versus column length illustrating performance of all three algorithms and systems for iceberg query processing on the patent data set in accordance with exemplary embodiments.

In the next example, the attribute length is changed. The length of an attribute is the size of the value type defined for an attribute. The larger the size an attribute has, the larger the size a table is. Therefore, attribute length affects relation size and thus disk access time. Also, as tuple-scan based algorithms operate on tuple values to compute the aggregation, attribute length also has impact on the computation cost. On the contrary, a bitmap index operates on bits and thus is not affected by attribute lengths. FIG. 10 illustrates a plot 1000 of time versus column length illustrating performance of all three algorithms and systems for iceberg query processing on the patent data set in accordance with exemplary embodiments. FIG. 10 specifically illustrates the experimental result of varying the attribute length from CHAR(10) to CHAR (100). Similar to FIG. 9, the processing times of RowDB and Baseline increase with attribute lengths increase, while icebergPQ stays the same.

Figure 11:
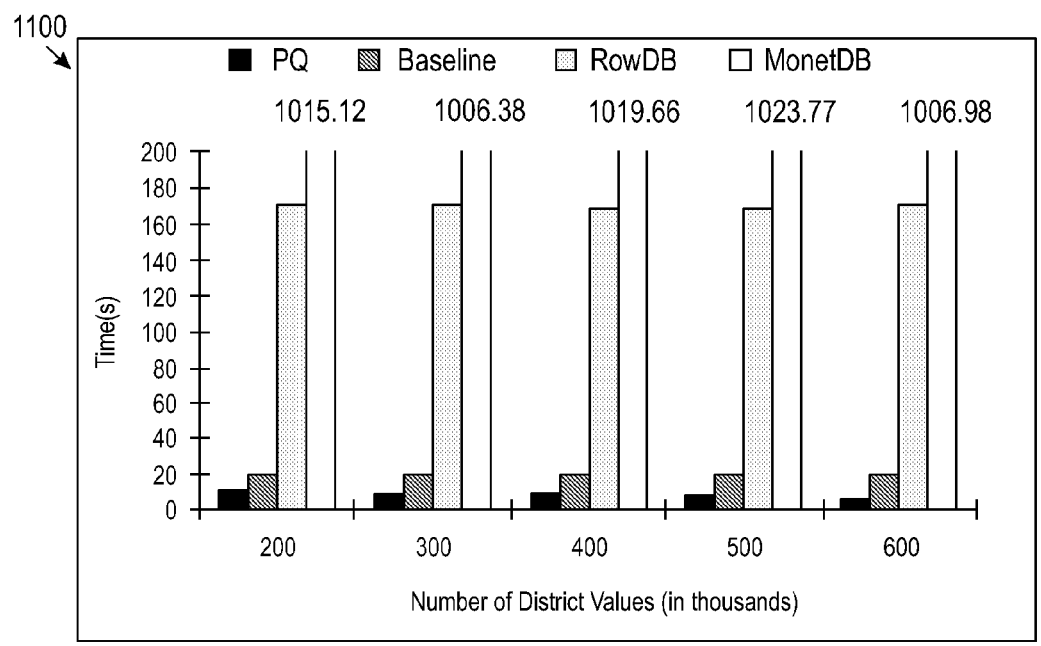
FIG. 11 illustrates a plot of time versus number of distinct values illustrating performance of all three algorithms and systems for iceberg query processing on the patent data set in accordance with exemplary embodiments.

Finally, the number of distinct values in attributes is changed. Given a fixed relation size, the performance of icebergPQ with respect to the number of distinct value in attributes is analyzed. Analytically, more distinct values indicate more vectors to process. However, each distinct value has fewer occurrences in the average, which means more vectors can be pruned by the icebergPQ algorithm. The number of distinct values is varied from 200,000 to 600,000 in an attribute. FIG. 11 illustrates a plot 1100 of time versus number of distinct values illustrating performance of all three algorithms and systems for iceberg query processing on the patent data set in accordance with exemplary embodiments. FIG. 11 illustrates that icebergPQ performs faster when there are more distinct values. The algorithm icebergPQ is also efficient when the distinct value is very small, because even though pruning may not be that effective in this case, the number of bitwise AND operations is very small and all AND operations can be quickly performed. The performances of RowDB and Baseline are not affected by the number of distinct values.

Figure 12:
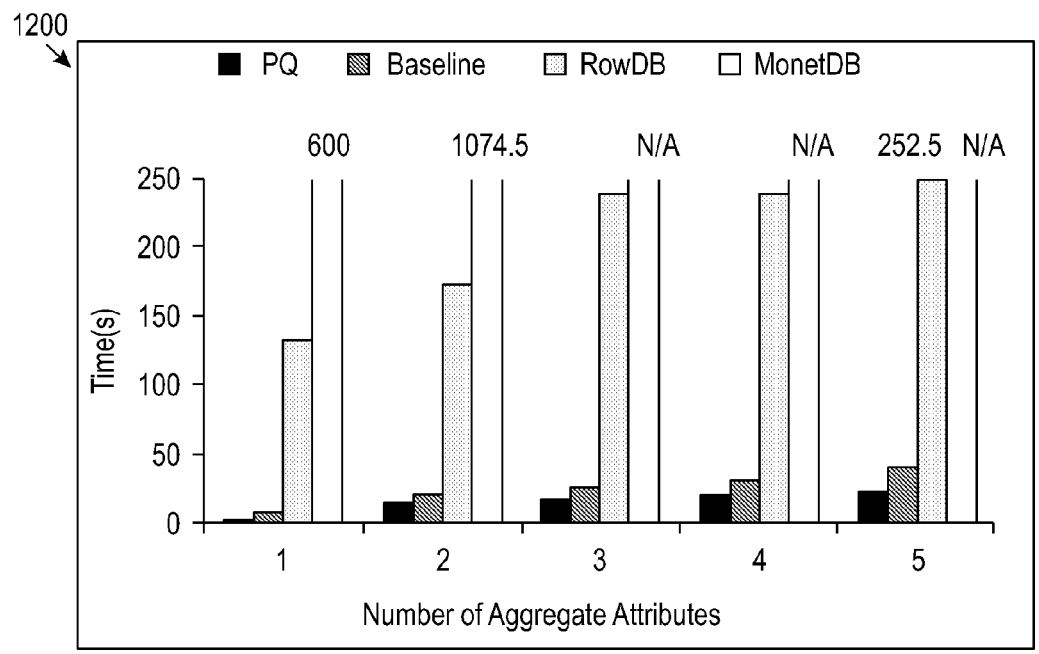
FIG. 12 illustrates a plot of time versus number of aggregate attributes illustrating performance of all three algorithms and systems for iceberg query processing on the patent data set in accordance with exemplary embodiments.

As discussed above, the exemplary methods and systems described herein can also be applied to iceberg query processing on multiple aggregate attributes. The performance of the exemplary algorithms on iceberg query processing on multiple aggregate attributes is now discussed. The examples described focus on two aggregate attributes. In exemplary embodiments, an icebergPQMulti algorithm extends icebergPQ on more than two aggregate attributes. The examples described herein test the effectiveness of icebergPQMulti implementing five queries, whose number of aggregate attributes vary from 1 to 5. FIG. 12 illustrates a plot 1200 of time versus number of aggregate attributes illustrating performance of all three algorithms and systems for iceberg query processing on the patent data set in accordance with exemplary embodiments. FIG. 12 illustrates that the icebergPQ algorithm presents better performance compared with all other systems. In all test cases, icebergPQ performs 10 times faster than the row oriented databases system RowDB. Compared with the optimal baseline algorithm, icebergPQ uses about ⅔ of the running time of the baseline algorithm. This experimental result shows that the exemplary algorithms described herein are not only effective when processing two attributes aggregation, but also scalable and efficient in processing iceberg queries with multiple aggregate attributes.

In exemplary embodiments, the algorithms process two attributes at a time when processing queries with more than two attributes. When there is sufficient memory, more attributes can be brought into the memory and be processed in one iteration. In other exemplary embodiments, the algorithms can be extended to support processing multiple attributes simultaneously.

Figure 13:
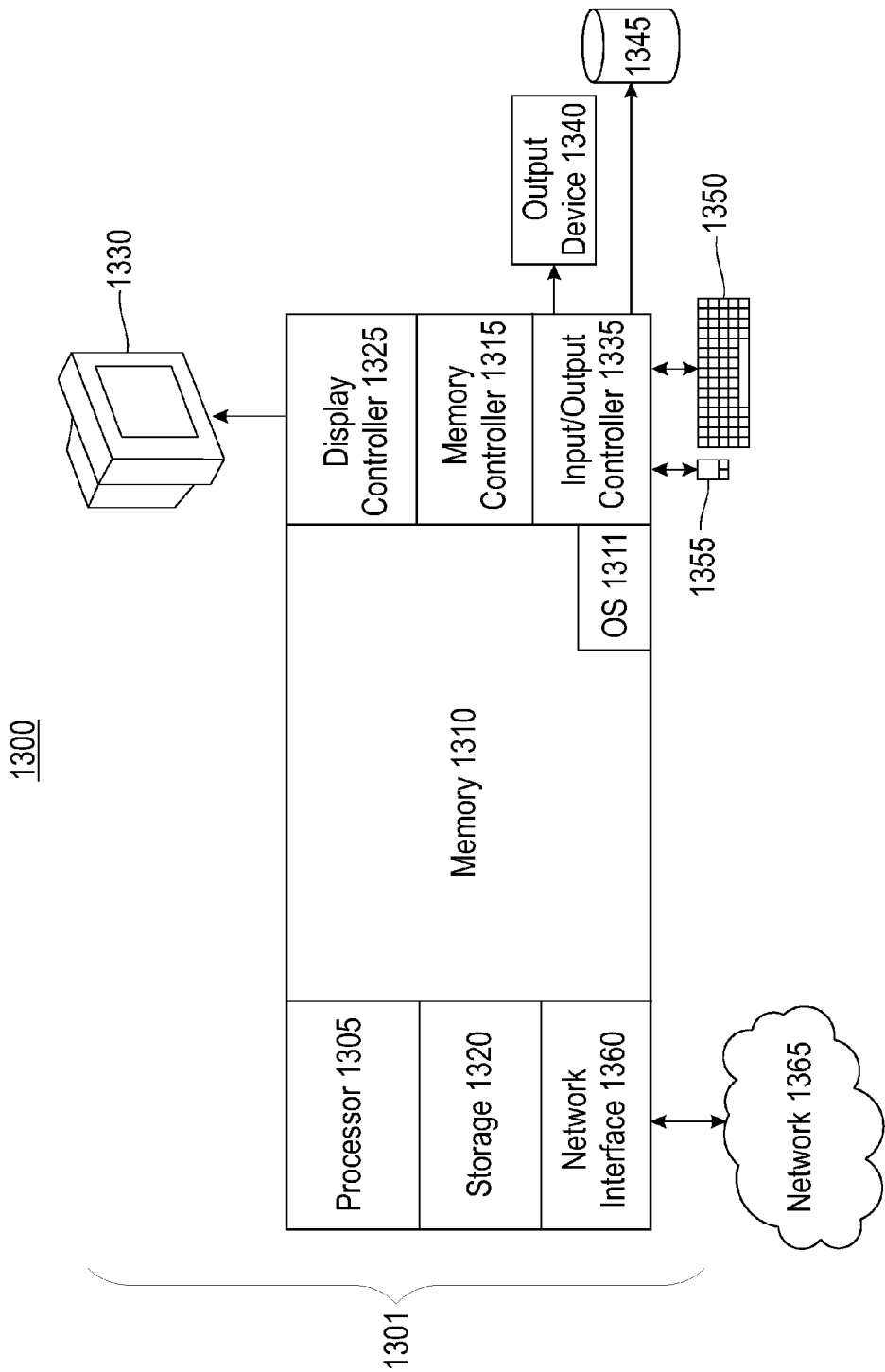
FIG. 13 illustrates an exemplary embodiment of an index-pruning based system for computing iceberg queries.

The exemplary index-pruning based iceberg query computation methods described herein can be performed on various computer systems. One system is now described. It is appreciated that other systems are contemplated. FIG. 13 illustrates an exemplary embodiment of an index-pruning based system 1300 for computing iceberg queries. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1300 therefore includes general-purpose computer 1301.

In exemplary embodiments, in terms of hardware architecture, as shown in FIG. 13, the computer 1301 includes a processor 1305, memory 1310 coupled to a memory controller 1315, and one or more input and/or output (I/O) devices 1340, 1345 (or peripherals) that are communicatively coupled via a local input/output controller 1335. The input/output controller 1335 can be, but is not limited to, one or more buses or other wired or wireless connections, as is known in the art. The input/output controller 1335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1305 is a hardware device for executing software, particularly that stored in memory 1310. The processor 1305 can be any custom made or commercially available processor, a central processing unit (CPU), an auxiliary processor among several processors associated with the computer 1301, a semiconductor based microprocessor (in the form of a microchip or chip set), a macroprocessor, or generally any device for executing software instructions.

The memory 1310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1310 may incorporate electronic, magnetic, optical, and/or other types of storage media. Note that the memory 1310 can have a distributed architecture, where various components are situated remote from one another, but can be accessed by the processor 1305.

The software in memory 1310 may include one or more separate programs, each of which comprises an ordered listing of executable instructions for implementing logical functions. In the example of FIG. 13, the software in the memory 1310 includes the index-pruning based iceberg query computation methods described herein in accordance with exemplary embodiments and a suitable operating system (OS) 1311. The operating system 1311 essentially controls the execution of other computer programs, such the index-pruning based iceberg query computation systems and methods as described herein, and provides scheduling, input-output control, file and data management, memory management, and communication control and related services.

The index-pruning based iceberg query computation methods described herein may be in the form of a source program, executable program (object code), script, or any other entity comprising a set of instructions to be performed. When a source program, then the program needs to be translated via a compiler, assembler, interpreter, or the like, which may or may not be included within the memory 1310, so as to operate properly in connection with the OS 1311. Furthermore, the index-pruning based iceberg query computation methods can be written as an object oriented programming language, which has classes of data and methods, or a procedure programming language, which has routines, subroutines, and/or functions.

In exemplary embodiments, a conventional keyboard 1350 and mouse 1355 can be coupled to the input/output controller 1335. Other output devices such as the I/O devices 1340, 1345 may include input devices, for example but not limited to a printer, a scanner, microphone, and the like. Finally, the I/O devices 1340, 1345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1300 can further include a display controller 1325 coupled to a display 1330. In exemplary embodiments, the system 1300 can further include a network interface 1360 for coupling to a network 1365. The network 1365 can be an IP-based network for communication between the computer 1301 and any external server, client and the like via a broadband connection. The network 1365 transmits and receives data between the computer 1301 and external systems. In exemplary embodiments, network 1365 can be a managed IP network administered by a service provider. The network 1365 may be implemented in a wireless fashion, e.g., using wireless protocols and technologies, such as WiFi, WiMax, etc. The network 1365 can also be a packet-switched network such as a local area network, wide area network, metropolitan area network, Internet network, or other similar type of network environment. The network 1365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1301 is a PC, workstation, intelligent device or the like, the software in the memory 1310 may further include a basic input output system (BIOS) (omitted for simplicity). The BIOS is a set of essential software routines that initialize and test hardware at startup, start the OS 1311, and support the transfer of data among the hardware devices. The BIOS is stored in ROM so that the BIOS can be executed when the computer 1301 is activated.

When the computer 1301 is in operation, the processor 1305 is configured to execute software stored within the memory 1310, to communicate data to and from the memory 1310, and to generally control operations of the computer 1301 pursuant to the software. The index-pruning based iceberg query computation methods described herein and the OS 1311, in whole or in part, but typically the latter, are read by the processor 1305, perhaps buffered within the processor 1305, and then executed.

When the systems and methods described herein are implemented in software, as is shown in FIG. 13, the methods can be stored on any computer readable medium, such as storage 1320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the index-pruning based iceberg query computation methods are implemented in hardware, the index-pruning based iceberg query computation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include, but are not limited to: 1) Saving disk access time by avoiding tuple-scan on a table with a lot of attributes, 2) Saving computation time by conducting bitwise operations, 3) Leveraging the monotone property of iceberg queries to develop aggressive pruning strategies. To solve the problem of massive empty AND results in bitmap index, an efficient vector alignment algorithm with priority queues is implemented. Optimization techniques are implemented to further improve the performance. Both analysis and examples illustrate that the exemplary algorithms outperform the tuple-scan based algorithms on both row oriented and column oriented databases.

A bitmap index can avoid massive disk access on tuples. Since a bitmap index is built on per column basis, for an iceberg query, the algorithms only access bitmap indexes of the grouping attributes (i.e., the attributes in the GROUP BY clause). Accessing tuples can be thus avoided. As such, disk access time is saved because a compressed bitmap index is smaller than the raw data. Further, in row-oriented databases, tuples are stored according to rows. A typical situation in warehouse applications is that an iceberg query only aggregate a few attributes on a table containing a large number attributes. In such a case, the query processor still has to read through all the columns in the table, which can be very expensive.

A bitmap index operates on bits other than real tuple values. Another major cost in iceberg query processing is the computation cost. Tuple-scan based algorithms process real tuple values, which are usually strings for grouping attributes. On the contrary, a bitmap index does not operate on values directly, as it uses bits to represent the existence of values. Bitwise operations are very fast to execute and can often be accelerated by hardware. As such, a bitmap index usually performs better than tree-based index, such as the variants of B-tree or R-tree on warehouse applications.

A bitmap index has the advantage of leveraging the monotone property of iceberg queries to enable aggressive pruning strategies. Iceberg queries have the monotone property because of the COUNT/SUM function: If the count of a group cl, ..., cn meets the threshold T and is in the iceberg result, the count of any subset of cl, ..., cn must also meet T. If the count of a value is below T, any group containing this value must below T. This property can be easily utilized with bitmap index to develop effective pruning strategies. Unlike tuple-scan based algorithms, where counting the aggregate function on a single value is not a simple task, the aggregate function on a single value (using its vector) can be computed without accessing other vectors in bitmap index. This difference gives bitmap index the advantage for efficiently leveraging the monotone property. The systems and methods described herein have been described with respect to the COUNT aggregate function. In exemplary embodiments, the systems and methods described herein can be extended to work with the SUM function. For the numeric attribute to be summed up, the algorithms can implement special bitmap index, the bit-sliced index, to index the values. The bit-sliced index is a compact bitmap index structure that is specially designed to represent numeric attributes, and shows great performance for aggregate queries for the SUM function. The exemplary algorithms described herein can be changed to leverage the bit-sliced index. Other than computing the count of 1-bits for each vector, the sum value for each vector can be computed with the help of the bit-sliced index.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were described in order to best explain the principles of the invention and its practical applications, and to enable others of ordinary skill in the art to understand the invention.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for performing an iceberg query, comprising:
   processing, by a computer processor, the iceberg query using a compressed bitmap index having a plurality of bitmap vectors in a database, wherein the iceberg query is a GROUP BY query operation on a set of grouping attributes with a selection condition;
   eliminating, by the computer processor, any of the plurality of bitmap vectors in the compressed bitmap index that fails to meet the selection condition thereby forming a result subset of the plurality of bitmap vectors, wherein the eliminating includes:
      reading a first subset of bitmap vectors from the plurality of bitmap vectors;
      ignoring each vector of the first subset in the plurality of bitmap vectors, which has a count of 1-bits below a predetermined threshold;
      reading a second subset of bitmap vectors from the plurality of bitmap vectors;
      ignoring each vector of the second subset in the plurality of bitmap vectors, which has a count of 1-bits below the predetermined threshold; and
      applying a bitwise And operation between all remaining bitmap vectors from the first subset and the second subset, wherein
         the bitwise And operation generating a nonempty result, thereby aligning the bitmap vectors in the result subset of according to respective positions of the remaining bitmap vectors in the first and second subsets, and
         a priority of the remaining bitmap vectors is defined by a position of a first untouched 1-bit in each of the remaining bitmap vectors, the first untouched 1-bit being a 1-bit with a smallest position in each of the remaining bitmap vectors.

2. The method as claimed in claim 1, wherein the compressed bitmap index vertically organizes a column in the database with the plurality of the bitmap vectors.

3. The method as claimed in claim 1, wherein the eliminating is implemented by dynamic pruning.

4. The method as claimed in claim 3, further comprising in response to the aligning, building a priority queue with the result subset, wherein each of the vectors of the result subset includes a priority based on a position of a first 1-bit of the bitmap vectors in the result subset.

5. The method as claimed in claim 4, further comprising shortening bitmap vector operations with a tracking pointer that points to respective locations of the 1-bit of each of the vectors in the result subset, wherein the tracking pointer is passed to the bitwise And operation.

6. The method as claimed in claim 4, further comprising reducing futile queue pushing via a global filter vector, the global filter vector recording 1-bit positions for the bitmap vectors that have been eliminated, such that in response to finding a first 1-bit of a bitmap vector, determining if a corresponding aligned bitmap vector has been eliminated.

7. A computer program product having a non-transitory computer readable storage medium including instructions for causing a computer to implement a method of performing an iceberg query, the method comprising:
   processing, by a computer processor, the iceberg query using a compressed bitmap index having a plurality of bitmap vectors in a database, wherein the iceberg query is a GROUP BY query operation on a set of grouping attributes with a selection condition;
   eliminating, by the computer processor, any of the plurality of bitmap vectors in the compressed bitmap index that fails to meet the selection condition thereby forming a result subset of the plurality of bitmap vectors, wherein the eliminating includes:
      reading a first subset of bitmap vectors from the plurality of bitmap vectors;
      ignoring each vector of the first subset in the plurality of bitmap vectors, which has a count of 1-bits below a predetermined threshold;
      reading a second subset of bitmap vectors from the plurality of bitmap vectors;
      ignoring each vector of the second subset in the plurality of bitmap vectors, which has a count of 1-bits below the predetermined threshold; and
      applying a bitwise And operation between all remaining bitmap vectors from the first subset and the second subset, wherein
         the bitwise And operation generating a nonempty result, thereby aligning the bitmap vectors in the result subset of according to respective positions of the remaining bitmap vectors in the first and second subsets, and
         a priority of the remaining bitmap vectors is defined by a position of a first untouched 1-bit in each of the remaining bitmap vectors, the first untouched 1-bit being a 1-bit with a smallest position in each of the remaining bitmap vectors.

8. The computer program product as claimed in claim 7, wherein the compressed bitmap index vertically organizes a column in the database by the plurality of bitmap vectors.

9. The computer program product as claimed in claim 7, wherein the eliminating is implemented by dynamic pruning.

10. The computer program product as claimed in claim 9, wherein the method further comprises in response to the aligning, building a priority queue with the result subset, wherein each of the vectors of the result subset includes a priority based on a position of a first 1-bit of the bitmap vectors in the result subset.

11. The computer program product as claimed in claim 10, wherein the method further comprising shortening bitmap vector operations with a tracking pointer that points to respective locations of the 1-bit of each of the vectors in the result subset, wherein the tracking pointer is passed to the bitwise And operation.

12. The computer program product as claimed in claim 10, wherein the method further comprises reducing futile queue pushing via a global filter vector, the global filter vector recording 1-bit positions for the bitmap vectors that have been eliminated, such that in response to finding a first 1-bit of a bitmap vector, determining if a corresponding aligned bitmap vector has been eliminated.

13. A method for performing an iceberg query method in a database, the method comprising:
- processing, by a computer processor, the iceberg query using a plurality of bitmap vectors vertically organized in a compressed bitmap index by eliminating, by dynamic pruning, any of the bitmap vectors that fail to meet a given condition thereby forming a result subset of the plurality of bitmap vectors, wherein the iceberg query is a GROUP BY query operation on a set of grouping attributes with the given condition, and the eliminating includes:
  - reading a first subset of bitmap vectors from the plurality of bitmap vectors;
  - ignoring each vector of the first subset in the plurality of bitmap vectors, which has a count of 1-bits below a predetermined threshold;
  - reading a second subset of bitmap vectors from the plurality of bitmap vectors;
  - ignoring each vector of the second subset in the plurality of bitmap vectors, which has a count of 1-bits below the predetermined threshold; and
  - applying a bitwise And operation between all remaining bitmap vectors from the first subset and the second subset, wherein
    - the bitwise And operation generating a nonempty result, thereby aligning the bitmap vectors in the result subset of according to respective positions of the remaining bitmap vectors in the first and second subsets, and
    - a priority of the remaining bitmap vectors is defined by a position of a first untouched 1-bit in each of the remaining bitmap vectors, the first untouched 1-bit being a 1-bit with a smallest position in each of the remaining bitmap vectors.

14. The method as claimed in claim 13, further comprising building a priority queue including the result subset of the plurality of bitmap vectors, each of the vectors in the subset including a priority based on a position of a first 1-bit of each of the bitmap vectors in the result subset.

15. The method as claimed in claim 14, further comprising shortening bitmap vector operations by a tracking pointer that points to respective locations of the first 1-bit of each of the vectors in the result subset in the database.

16. The method as claimed in claim 14, further comprising reducing futile queue pushing by a global filter vector, which records 1-bit positions for the bitmap vectors that have been eliminated.

17. A computer system configured to process an iceberg query in a database, the system comprising:
- a computer memory including the database that includes a plurality of bitmap vectors vertically organized in a compressed bitmap index;
- a computer processor communicatively coupled to the computer memory and configured to process the iceberg query by eliminating, by dynamic pruning, any of the plurality of bitmap vectors in the compressed bitmap index that fails to meet a given condition thereby forming a result subset of the plurality of bitmap vectors, wherein the iceberg query which is a GROUP BY query operation on a set of grouping attributes with the given selection condition, and the eliminating includes:
  - reading a first subset of bitmap vectors from the plurality of bitmap vectors;
  - ignoring each of the first subset in the plurality of bitmap vectors, which has a count of 1-bits below a predetermined threshold;
  - reading a second subset of bitmap vectors from the plurality of bitmap vectors;
  - ignoring each of the second subset in the plurality of bitmap vectors, which has a count of 1-bits below the predetermined threshold; and
  - applying a bitwise And operation between all remaining bitmap vectors from the first subset and the second subset, wherein
    - the bitwise And operation generating a nonempty result, thereby aligning the vectors in the result subset according to a respective position of each of the bitmap vectors in the result subset, and
    - a priority of the remaining bitmap vectors is defined by a position of a first untouched 1-bit in each of the remaining bitmap vectors, the first untouched 1-bit being a 1-bit with a smallest position in each of the remaining bitmap vectors.

18. The system as claimed in claim 17, wherein the processor is further configured to, in response to the aligning, build a priority queue in the computer memory with the result subset, wherein each of the bitmap vectors in the result subset includes a priority based on a position of a first 1-bit of each of the bitmap vectors in the result subset.

19. The system as claimed in claim 17, wherein the processor is further configured to perform at least one of the following:
  - i) shorten bitmap vector operations via a tracking pointer that points to a memory location in the computer memory of the first 1-bit in the computer memory of each of the vectors in the result subset, and
  - ii) reduce futile queue pushing via a global filter vector, which records 1-bit positions for the bitmap vectors that have been eliminated.

* * * * *